UNITED STATES PATENT OFFICE.

ANDREW A. DUNHAM, OF BAINBRIDGE, NEW YORK, ASSIGNOR TO CASEIN COMPANY OF AMERICA, A CORPORATION OF NEW JERSEY.

PROCESS OF PRODUCING MILK-SUGAR.

No. 931,584.    Specification of Letters Patent.    Patented Aug. 17, 1909.

Application filed November 23, 1908. Serial No. 464,098.

*To all whom it may concern:*

Be it known that I, ANDREW A. DUNHAM, a citizen of the United States, residing at Bainbridge, in the county of Chenango and State of New York, have invented or discovered certain new and useful Improvements in Processes for Producing Milk-Sugar, of which the following is a specification.

In the process of making milk sugar now generally in use the whey is first treated with lime to neutralize its acidity and is then boiled to precipitate the albumen. After this boiling it is filtered for the purpose of removing the albumen and is next evaporated to about 22° Baumé, at which point a further slight amount of albumen is precipitated by the evaporation process. It is then again filtered to remove this coagulated albumen and then evaporated to the crystallizing point. The syrup is then drawn off and allowed to stand several days to crystallize into sugar. The crude sugar thus obtained is then washed in a centrifugal machine, and in this process of washing there is considerable waste amounting to approximately 25% of the crystallized sugar. After being subjected to the operation of the centrifugal machine the product is dried, producing what is known as dried crude sugar, which is then refined to produce a commercial article. The refining process consists in dissolving the crude sugar, passing the syrup thus obtained through a filter press and then repeatedly passing the syrup through bone dust or other clarifying agent until it is well clarified. This filtration of the syrup results in a loss of about 5% of crystallizable sugar for each passage of the syrup through the bone black, as has been demonstrated by actual tests. The clarified syrup is then evaporated to crystallization and the sugar thus obtained is again washed in a centrifugal machine and the refined product is then dried and ground to produce a commercial commodity. This process of producing milk sugar results in a relatively costly product, owing largely to the resulting wastage; and the present invention has for its object to produce milk sugar by a relatively simple process by which milk sugar may be produced at very much less cost and at a great saving as compared with the old process, so that a much larger amount of sugar is obtained from a given amount of whey.

In practicing the novel process the whey is first subjected to the action of lime, to neutralize its acidity, and is then boiled to precipitate the albumen which is then removed from the whey by filtration as in the old process. After the albumen has been removed from the whey the latter is preferably treated with phosphoric acid, such treatment involving the use of about three ounces of the commercial acid thoroughly mixed with about 100 pounds of the whey. Instead of using phosphoric acid in this preliminary treatment of the whey before clarification similar proportions of sulfuric or hydrochloric acid may be employed. The whey thus acidified is now clarified by being passed through bone dust, infusorial earth or other comminuted clarifying material, such clarification usually being effected by passing the whey only once through the bone dust, although sometimes a second passage of the whey through the bone dust is better in order to secure complete clarification. The refined and clarified whey is then neutralized with lime, which results in the precipitation of a further amount of albumen and a by-product of calcium phosphate. The whey is then again filtered through a filter press, removing the precipitated albumen and the calcium phosphate by-product, leaving the whey in a perfectly clarified condition practically as clear as distilled water. To make what would be termed crude milk sugar this clarified whey may next be evaporated to the crystallizing point, resulting in a product which is much whiter and better than crude sugar obtained by the old process after washing in a centrifugal machine; and as the crude sugar resulting from the improved process does not require washing in a centrifugal machine the waste resulting from such washing is avoided, and consequently about 25% more of crude sugar is obtained by this process than can be obtained from a given quantity of whey by the old process. Instead, however, of evaporating the clarified whey to the crystallizing point, as just stated, it is preferred to evaporate it to about 22° Baumé, which will result in precipitating the small amount of albumen remaining in the whey, and then pass the very thin syrup through a filter press to remove the remaining slight quantity of precipitated albumen; and the thin syrup is then evaporated to the crystallizing point and the sugar thus obtained is next slightly washed in a centrifugal machine. The product thus obtained is then dried and ground, producing a pure commercial article of refined sugar. It will thus be understood that the reduction or concentration of the clarified whey to the crystallization point may be effected either all at once, by one step, or in two successive steps with an intervening filtration step.

From the foregoing it will be apparent that the improved process of making refined milk sugar is not only much simpler and therefore less expensive to practice than the old process, but results in the production of a considerably larger quantity of sugar from a given amount of whey, in that the necessity of washing the crude sugar and the loss resulting from such washing are wholly avoided; the wash-water from the final washing of the sugar, above mentioned, being returned to the next batch of whey, so that no wastage results from this final washing. Also the loss of crystallizable sugar, resulting from filtering the syrup through bone black is avoided in practicing the novel process, as the loss of sugar in the improved process in filtering the whey or very thin syrup through bone black or other clarifying material is practically *nil*.

Although it is preferred, in the novel process, to acidify the whey after the first filtration, and before clarification, as hereinbefore stated, for the purpose of insuring more complete precipitation of the albumen, this step is not really essential and may be omitted, if desired. It is also preferred to clarify the whey before the same is reduced or evaporated at all, but this, however, is not positively necessary, as the clarification may be effected after the whey has been evaporated down to about 22° Baumé; or, in fact, at any time before the whey or syrup is reduced or evaporated to the crystallizing point. It will therefore be understood that the essentially novel step of the improved process consists in the clarification of the whey prior to reducing the whey or syrup to the point of crystallization, as washing of the crude sugar, and the wastage resulting therefrom, is thus avoided.

As hereinbefore stated, the whey or very thin syrup, when treated as hereinbefore described and filtered through bone-black, infusorial earth or other clarifying material, is so perfectly clarified as to be practically as clear as distilled water. The term "clarifying", as used in the claims of this specification in connection with the treatment of whey, will therefore be understood to mean making the whey entirely clear prior to crystallization; which, as above stated, is the essentially novel feature of the improved process.

Having thus described my invention I claim and desire to secure by Letters Patent:

1. That step in the process of producing milk sugar which consists in clarifying the whey prior to reducing the same to the crystallizing point.

2. The herein described process of producing milk sugar, consisting in boiling the whey to precipitate the albumen, filtering the whey to remove such precipitated albumen, clarifying the whey by filtering the same through a clarifying material, and then evaporating the clarified whey to crystallization.

3. The herein described process of producing milk sugar consisting in boiling the whey to precipitate the albumen, filtering the whey to remove such precipitated albumen, treating the whey with acid to precipitate the remaining albumen, clarifying the whey by filtering the same through a clarifying material, and then evaporating the clarified whey to crystallization.

4. The herein described process of producing milk sugar consisting in boiling the whey to precipitate the albumen, next filtering the whey to remove such precipitated albumen, clarifying the whey by filtering the same through a clarifying material, concentrating the whey by evaporation down to about 22° Baumé, passing the thin syrup thus obtained through a filter press to remove the remaining slight quantity of precipitated albumen, and then evaporating the clarified syrup to crystallization.

In testimony whereof I affix my signature, in presence of two witnesses.

ANDREW A. DUNHAM.

Witnesses:
HENRY CALVER,
CHAS. S. HYER.